(12) United States Patent
Wu et al.

(10) Patent No.: US 7,775,038 B2
(45) Date of Patent: Aug. 17, 2010

(54) SECOND AIR FLOW CONTROL APPARATUS

(75) Inventors: Chia-Wu Wu, Taoyuan (TW); Vincent Shiu, Taoyuan (TW)

(73) Assignee: Sentec E&E Co., Ltd, Taoyuan (TW)

( * ) Notice: Subject to any disclaimer, the term of this patent is extended or adjusted under 35 U.S.C. 154(b) by 366 days.

(21) Appl. No.: 11/958,383

(22) Filed: Dec. 18, 2007

(65) Prior Publication Data

US 2009/0094967 A1    Apr. 16, 2009

(30) Foreign Application Priority Data

Oct. 16, 2007    (TW)    ............................... 96138621 A

(51) Int. Cl.
*F01N 3/00*    (2006.01)
(52) U.S. Cl. ............................. 60/289; 60/280; 60/281; 60/293; 60/304
(58) Field of Classification Search ........... 60/284–287, 60/295; 251/208, 294, 31, 311, 312; 137/625.31, 137/625.3, 510, 613
See application file for complete search history.

(56) References Cited

U.S. PATENT DOCUMENTS

| | | | | |
|---|---|---|---|---|
| 4,103,488 A | * | 8/1978 | Aoyama | ...................... 60/289 |
| 5,417,083 A | * | 5/1995 | Eber | ........................... 62/528 |
| 6,206,339 B1 | * | 3/2001 | Parker et al. | ........... 251/129.03 |
| 6,263,898 B1 | * | 7/2001 | Vanderveen et al. | ..... 137/15.25 |

* cited by examiner

*Primary Examiner*—Thomas E Denion
*Assistant Examiner*—Jesse Bogue
(74) *Attorney, Agent, or Firm*—Chun-Ming Shih

(57) ABSTRACT

A second air flow control apparatus disposed between an air inlet port of an engine and an exhaust port includes a body, a base, a moving member, and a gas thread. The body has a cavity, an air inlet and an air outlet, the air inlet and the air outlet being connected through the cavity. The base is fixed in the cavity, having at least an opening for controlling the air flow through the air flowing path. The moving member is pivotably disposed in the cavity or the base by a spring force and having at least a gate and a cover configured for controlling the area of the opening. The gas thread is connected to the moving member and configured for pulling the moving member to generate a processional rotation and a resetting rotation. The rotations are configured for controlling the gate and the cover part to adjust the opening area of the opening so as to precisely control the second air flow.

11 Claims, 15 Drawing Sheets

SECOND AIR FLOW CONTROL APPARATUS

BACKGROUND OF THE INVENTION

1. Field of the Invention

The present invention relates to a second air flow control apparatus, and more particularly to a second air flow control apparatus that is disposed in a second air supply path at an engine exhaust port for controlling a second air flow into the engine exhaust port.

2. Description of related art

Catalytic converter is a metal cylinder with catalytic coating that contains rare metal such as Pd and Pt. The catalytic coating can convert the harmful CO and HC in exhaust gas into harmless $CO_2$ and $H_2O$, or convert the harmful $NO_x$ in the exhaust gas into harmless $N_2$ and $O_2$, so as to clean the exhaust gas and alleviate the negative effect of exhaust gas on the environment. For facilitate the oxidation reactions between the catalyst and the harmful substance in the exhaust gas, second air has been flown to an engine exhaust port. In this technology, a second air supply tube is disposed on the engine exhaust tube before the catalytic converter. The pressure of the exhaust gas pushes the fresh air outside, i.e., second air, to flow into the gas exhaust tube so as to increase the amount of $O_2$ in the exhaust gas and improve the efficiency of the oxidation of CO and HC by the catalyst.

It is known that when automobiles travel at a speed of 35 to 55 km/hr in a crowded city, the CO amount in the engine exhaust gas is relatively small (shown in FIG. 25), but the $NO_x$ amount in the engine exhaust gas is large (shown in FIG. 26). Now, if second air is continuously provided into the engine exhaust tube, it is not good for the catalyst to reduce the $NO_x$ in the exhaust gas. So in a conventional technology, a pressure control valve connected to the engine gas inlet or engine outlet is used so as to control the second air flow in the engine exhaust port (gas exhaust tube) by the gas pressure of the engine.

However, the pressure control valve is not capable of precisely controlling the second air flow in the engine exhaust port. The catalyst still can not effectively reduce the $NO_x$ so that some of the $NO_x$ is emitted to the external air. Such $NO_x$ is a primary cause for acid rains and damages on the ozone layer and has a very negative impact on the natural environment. Hence the above-mentioned problem needs to be solved.

SUMMARY OF THE INVENTION

To overcome the above-mentioned problem of not being able to precisely control the second air flow in the exhaust port, an object of the present invention is to provide a second air control apparatus disposed in a second air flow path of the engine, which can precisely control the second air flow in the exhaust port by the amount of acceleration turned on for an automobile, so as to improve the efficiency of engine exhaust purification.

To achieve the above-mentioned objects, a second air flow control apparatus in accordance with a first embodiment of the present invention, being disposed between an air inlet port of an engine and an exhaust port and configured for pushing a second air from the air inlet port to the exhaust port by the exhausting pressure of the exhaust gas, the second air flow control apparatus including:

a body, having a cavity, an air inlet and an air outlet, the air inlet and the air outlet being connected through the cavity, the air inlet being connected with the air inlet port, the air outlet being connected with the exhaust port, an air flowing path being formed by the air inlet port, the air inlet, the air outlet and the exhaust port;

a base, fixed in the cavity, having at least an opening for controlling the air flow through the air flowing path;

a moving member pivotably disposed in the cavity or the base by a spring force and having at least a gate and a cover configured for controlling the area of the opening; and a gas thread being connected to the moving member and configured for pulling the moving member to generate a processional rotation by a loading spring force and a resetting rotation by a releasing spring force, the rotations being configured for controlling the gate and the cover part to adjust the opening area of the opening and for controlling the cover part to close the opening so as to control the second air flow in the air flowing path.

By this means, the harmful CO and $NO_x$ in the exhaust gas are purified together by the catalyst.

In further embodiments, the gas thread pulling the moving member to have a processional rotation is defined as the process of the engine accelerates from a low speed to a high speed. The gas thread releasing the moving member to have a resetting rotation is defines as the process of the engine decelerates from a high speed to a low speed, and in processing or resetting process. The gate and the cover part can control the opening to gradually change from being open to being closed or to gradually change from being closed to being open.

When the opening is closed, which is defined as the engine having a speed between 35 km/hr to 55 km/hr in a city or traffic driving mode, the second air is blocked from flowing into the exhaust port. There are multiple openings, the multiple openings being disposed next to each other on the base along the direction the moving member moves or resets. The opening is composed by multiple net holes.

A spring is disposed between the moving member and the body or the base, the spring being configured for making the moving member generate a processional rotation by a loading spring force and a resetting rotation by a releasing spring force.

The gas thread is connected to a thread wheel and connected to the moving member through a center axis on the thread wheel for pulling the moving member have a processional rotation.

A second air control valve is contained in the upper part of the body, the second air control valve having a valve, the valve being disposed in the cavity between the air inlet and the moving member.

According to a second embodiment of the present invention, the base can be eliminated and the moving member can be directly pivotably disposed on the body by a loading spring force. The moving member has at least a gate extending and implanted into the cavity, and at least a cover near to an end of the gate. The gas thread is configured for pulling the moving member to generate a processional rotation by a loading spring force and a resetting rotation by a releasing spring force, the rotations being configured for controlling the gate and the cover part to adjust the opening area of at least a tube mouth of the air inlet and the air outlet in the cavity, and for controlling the cover part to cover the tube mouth so as to control the second air flow in the air flowing path.

In addition, in the processing or resetting process, the gate and the cover part can control the tube mouth to gradually change from being open to being closed or to gradually change from being closed to being open. When the tube mouth is closed, which is defined as the engine having a speed between 35 km/hr to 55 km/hr in a city or traffic driving mode, the second air is blocked from flowing into the exhaust port.

A spring is disposed between the moving member and the body, the spring being configured for generating a processional rotation of the moving member by a loading spring force and a resetting rotation of the moving member by a releasing spring force. The gas thread is connected to a thread wheel, the thread wheel being formed on a side of the moving member for pulling the moving member to have a processional rotation.

Other advantages and novel features will be drawn from the following detailed description of preferred embodiment with the attached drawings, in which:

BRIEF DESCRIPTION OF THE DRAWINGS

FIG. 2 is a cross-sectional view of the second air flow control apparatus of FIG. 1a;

FIG. 2a is another cross-sectional view of the second air flow control apparatus of FIG. 1a;

FIG. 3 is a top down view of the base of the second air flow control apparatus of FIG. 1a;

FIG. 4 is a top down view of the moving member of the second air flow control apparatus of FIG. 1a;

FIG. 5 is a cross-sectional view of the moving member on the base of the second air flow control apparatus of FIG. 1a;

FIG. 6 is a top down view of another base of the second air flow control apparatus of FIG. 1a;

DETAILED DESCRIPTION OF THE INVENTION

Figure 1:
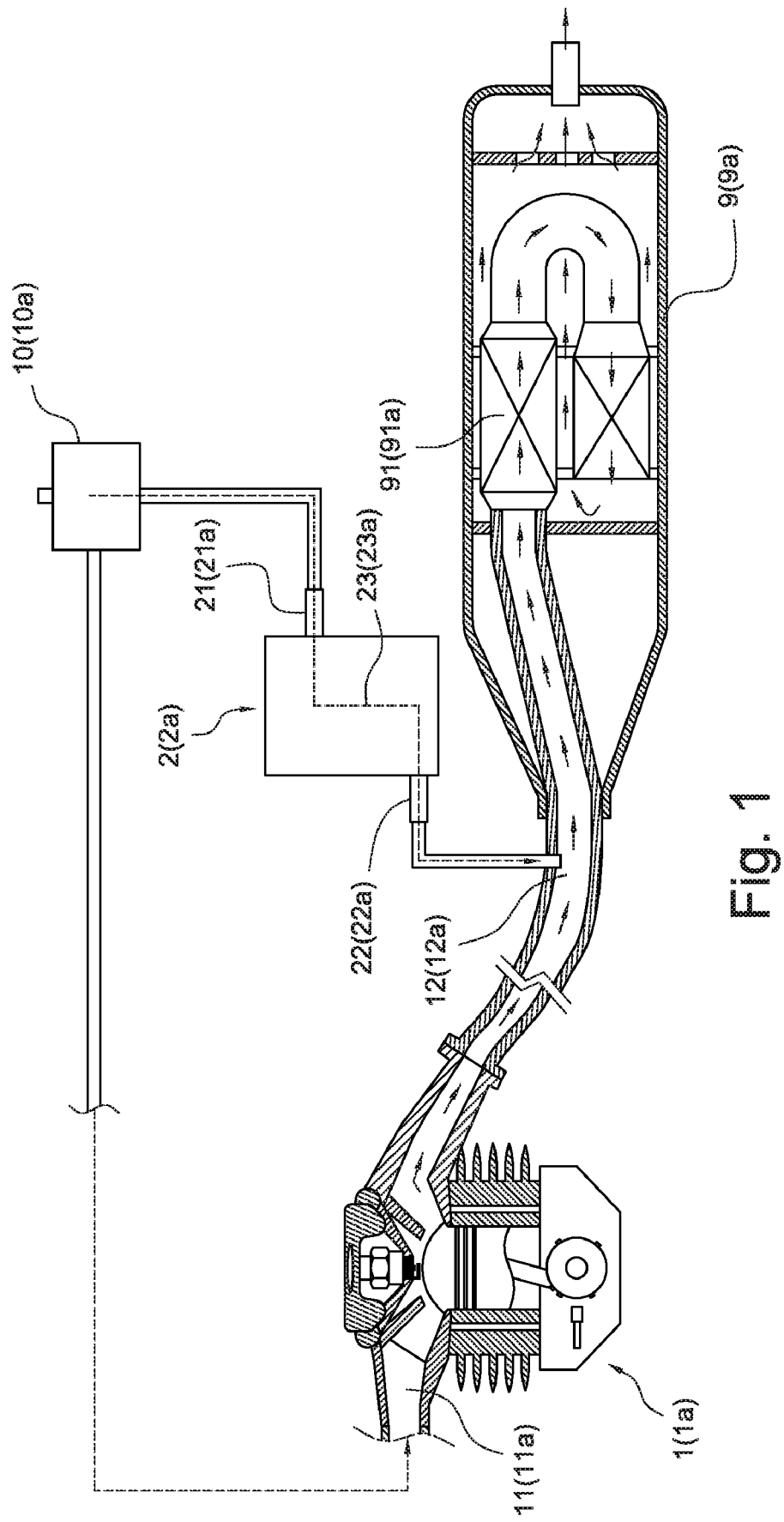
FIG. 1 is a schematic view of a second air flow control apparatus in accordance with the present invention.
Figure 1A:
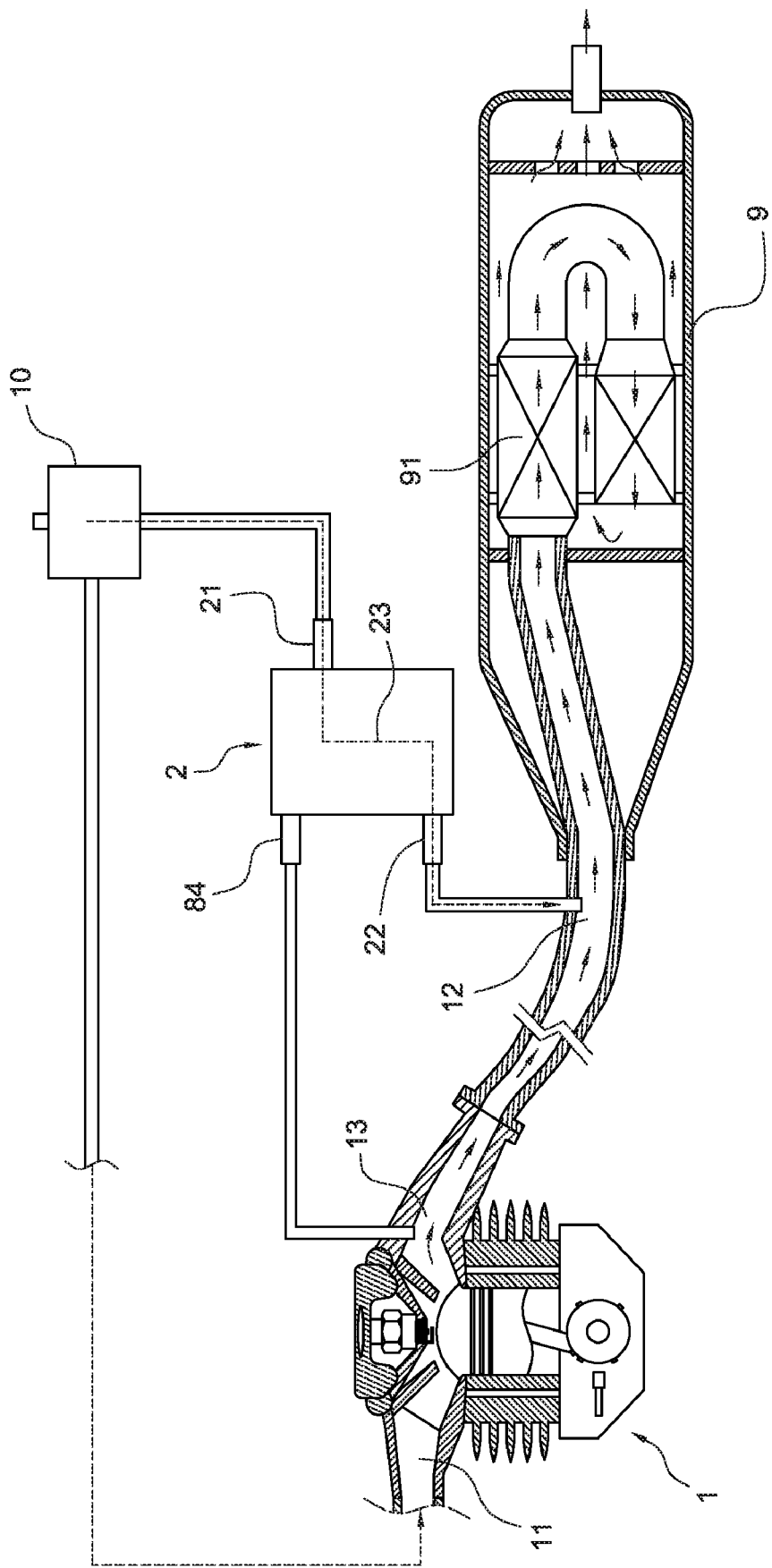
FIG. 1a is a schematic view of a second air flow control apparatus in accordance with a first embodiment of the present invention.
Figure 2:
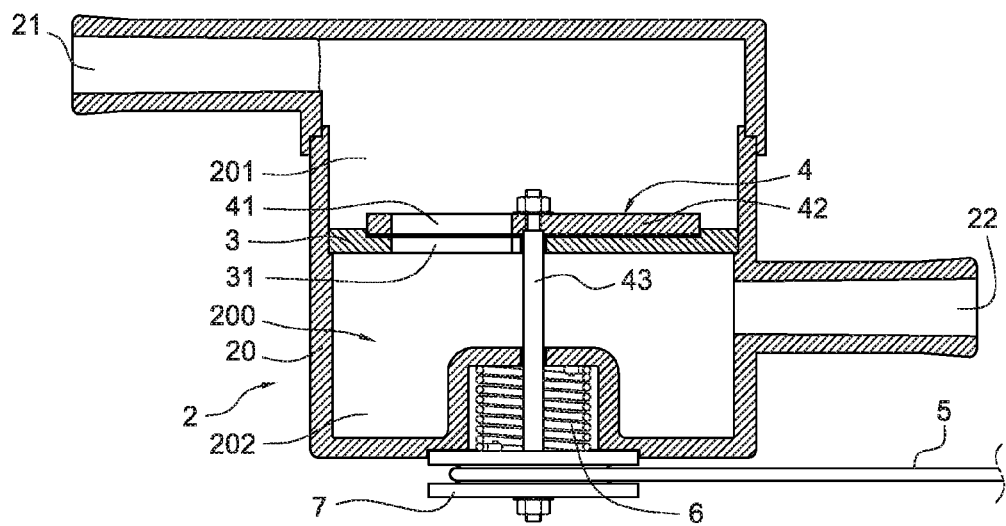

FIG. 1 is a schematic view of the second air flow control apparatus in accordance with a first embodiment of the present invention. Referring to FIG. 1 and FIG. 2, the second air flow control apparatus 2 is disposed between an air inlet port 10 of an engine 1 and an exhaust port 12. In this embodiment, the air inlet port 10 is an air filter connected with an engine air inlet passage 11. The exhaust port 12 includes an air outlet passage of the engine 1, a muter 9 and at least a catalytic converter 91, the air outlet passage of the engine 1, the muter 9 and the at least a catalytic converter 91 being connected in series. The exhausting pressure of the exhaust gas in the air outlet passage of the engine 1 pushes a second air from the air inlet port 10 to the exhaust port 12. The second air flow control apparatus 2 includes a body 20, a base 3, a moving member 4, and a gas thread 5.

Referring to FIG. 1, the body 20 has a cavity 200, an air inlet 21 and an air outlet 22. The air inlet 21 and the air outlet 22 are connected through the cavity 200. The air inlet 21 is connected with the air inlet port 10. The air outlet 22 is connected with the exhaust port 12. An air flowing path 23 is formed by the air inlet port 10, the air inlet 21, the air outlet 22 and the exhaust port 12.

Figure 3:
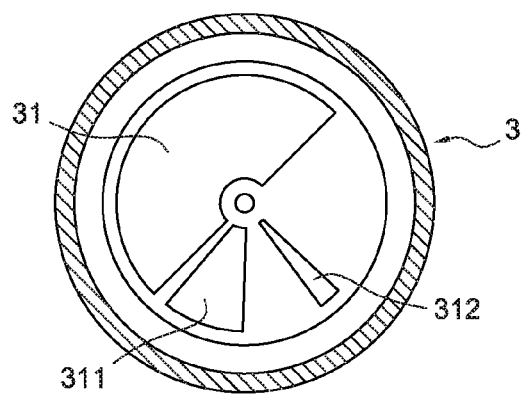

Referring to FIG. 3, the base 3 is fixed in the cavity 200, dividing the cavity 200 into a upper cavity connected with the air inlet 21 and a lower cavity 202 connected with the air outlet 22. At least an opening 31 is formed on the base 3 that can be used to control the air flow through the air flowing path 23.

Figure 4:
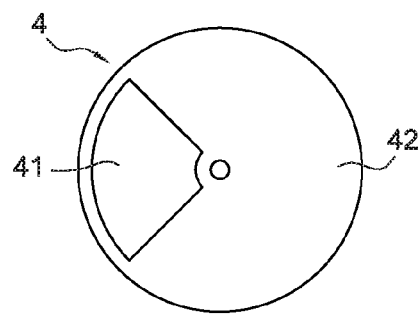
Figure 5:
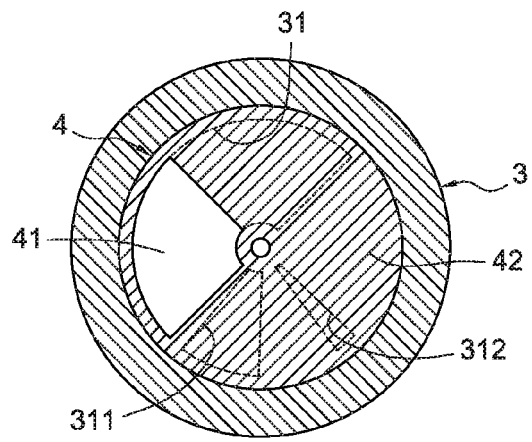

Referring to FIG. 4, the moving member 4 is pivotably disposed in the body 20 or the base 3 by a loading spring force. The moving member 4 has at least a gate 41 and a cover 42 configured for controlling the area of the opening 31.

Figure 2A:
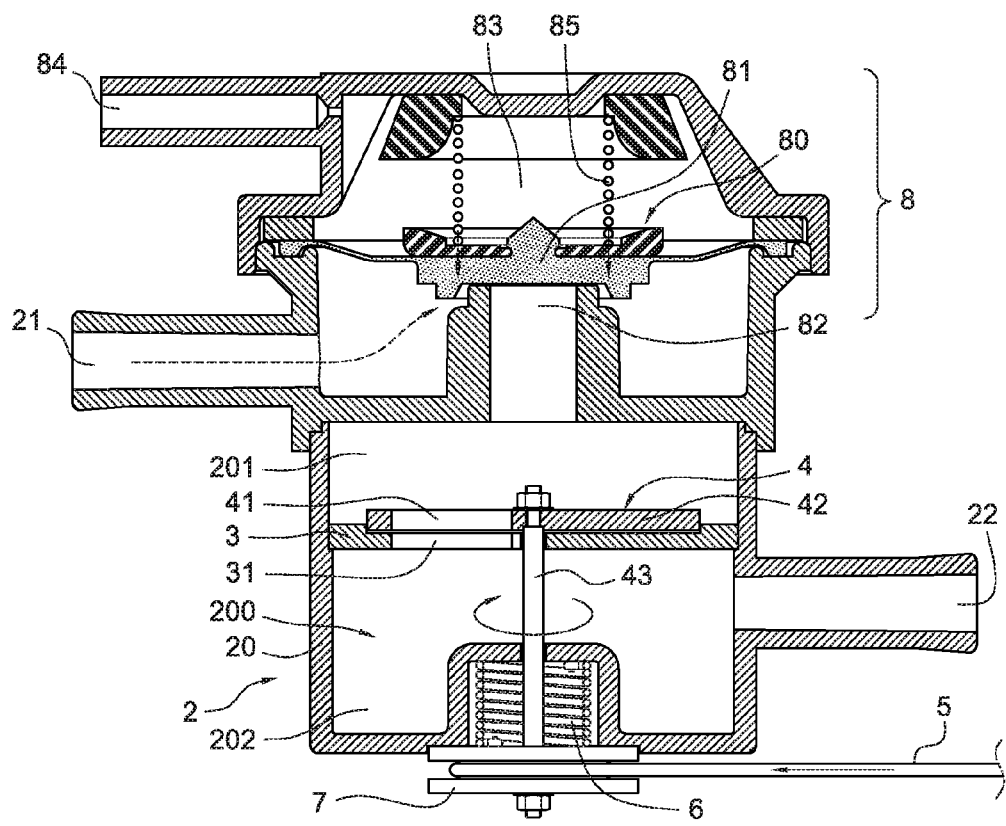
Figure 7:
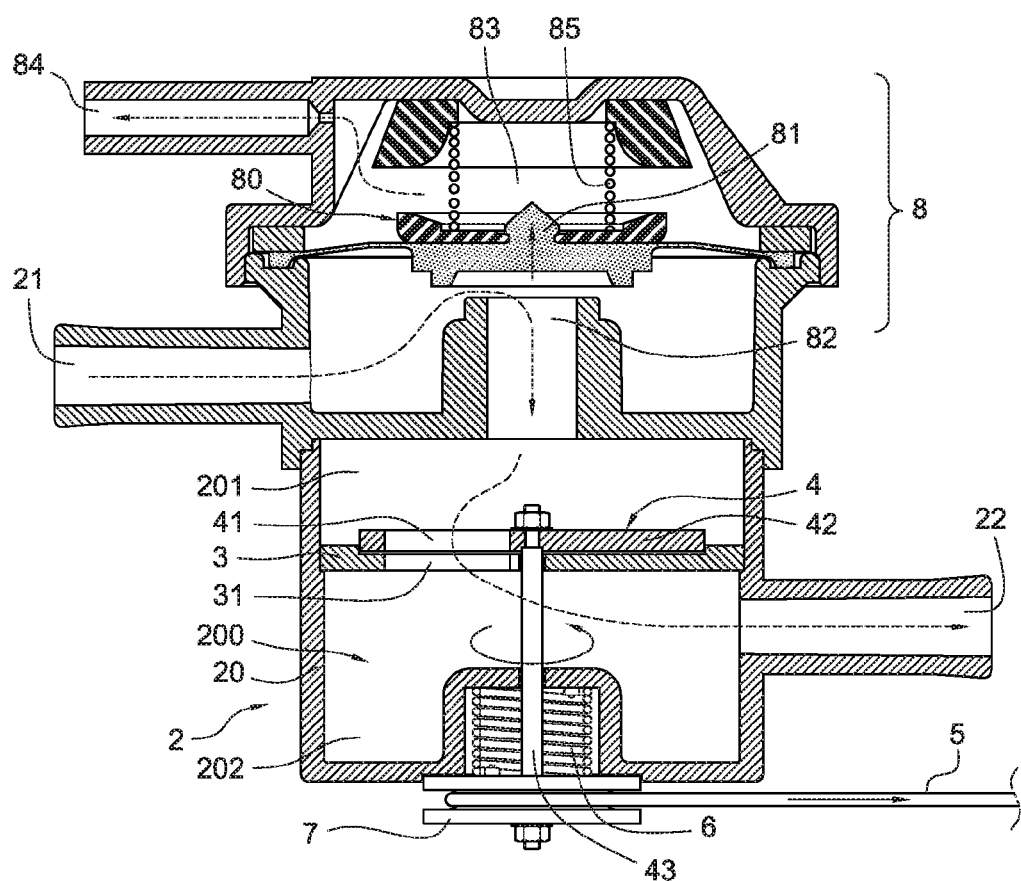
FIG. 7 is a cross-sectional view of the second air flow control apparatus of FIG. 2 in a working status.
Figure 8:
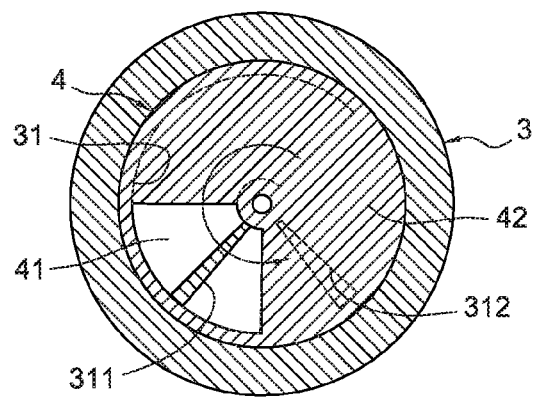
FIG. 8 is a cross-sectional view of the moving member on the base of the second air flow control apparatus of FIG. 5 in a working status.
Figure 9:
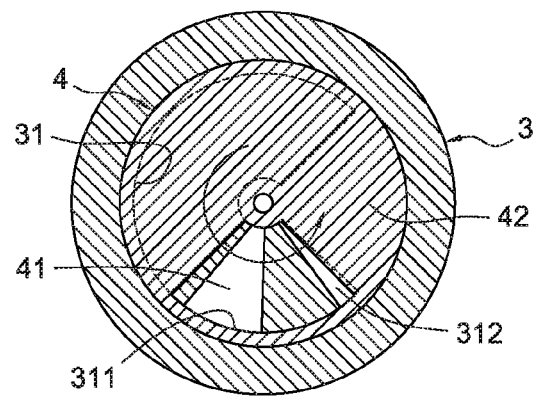
FIG. 9 is a cross-sectional view of the moving member on the base of the second air flow control apparatus of FIG. 5 in another working status.
Figure 10:
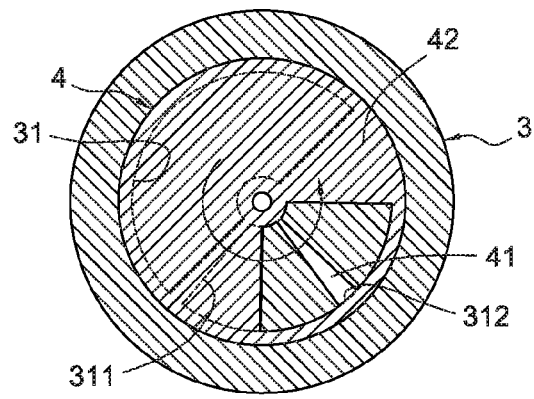
FIG. 10 is a cross-sectional view of the moving member on the base of the second air flow control apparatus of FIG. 5 in still another working status.

Referring to FIG. 7, the gas thread is connected to the moving member 4. The moving member 4 generates a processional rotation by a loading spring force and a resetting rotation by a releasing spring force (shown in FIG. 2a), which make the gate 41 and the cover part 42 control the opening area of the opening 31, as shown in FIG. 8 to FIG. 12, or make the cover part 42 close the opening 31 so as to control the second air flow in the air flowing path 23.

In further embodiments, the gas thread 5 pulling the moving member 4 to have a processional rotation is defined as the process of the engine 1 accelerates from a low speed to a high speed. The gas thread 5 releasing the moving member 4 to have a resetting rotation is defines as the process of the engine 1 decelerates from a high speed to a low speed. In moving or resetting process, the gate 41 and the cover part 42 can control the opening 31 to gradually change from being open to being closed (referring to FIG. 8 to FIG. 13), or to gradually change from being closed to being open.

Figure 6:
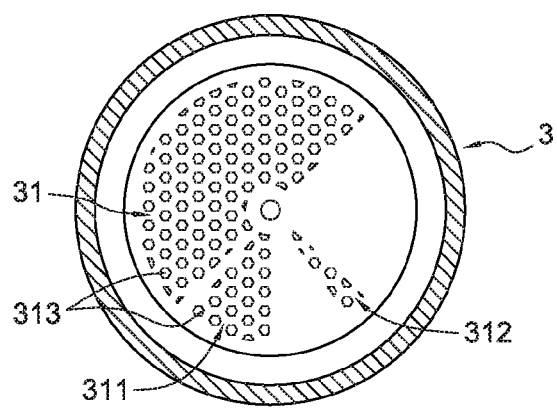
Figure 11:
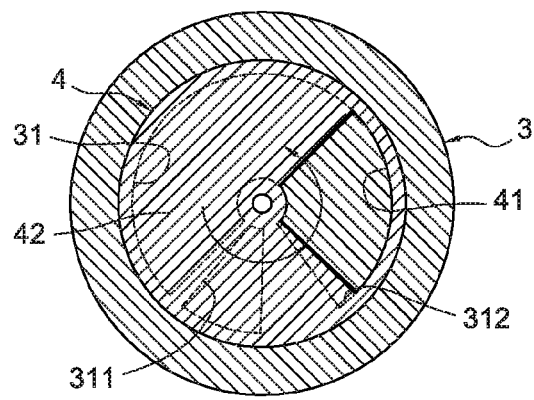
FIG. 11 is a cross-sectional view of the moving member on the base of the second air flow control apparatus of FIG. 5 in yet another working status.
Figure 12:
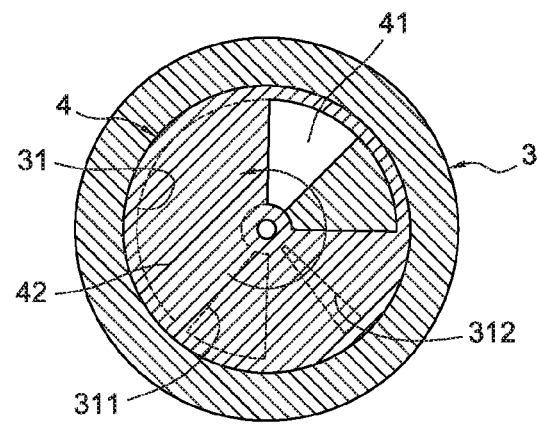
FIG. 12 is a cross-sectional view of the moving member on the base of the second air flow control apparatus of FIG. 5 in yet another working status.
Figure 13:
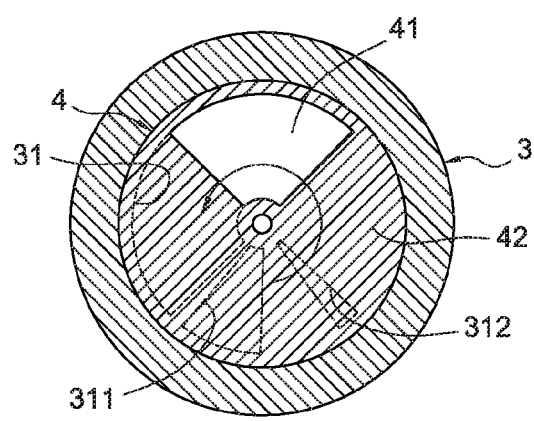
FIG. 13 is a cross-sectional view of the moving member on the base of the second air flow control apparatus of FIG. 5 in yet another working status.

Referring to FIG. 11, when the opening 31 is closed, which is defined as the engine 1 having a speed between 35 km/hr to 55 km/hr in a city or traffic driving mode, the second air is blocked from flowing into the exhaust port 12. In this embodiment, there are multiple openings 31. As shown in FIG. 3, the openings 31, 311 and 312 are disposed next to each other on the base 3 along the direction the moving member 4 moves or resets. The openings 31, 311 and 312 can also be composed by multiple net holes, as shown in FIG. 6.

Referring to FIG. 2, a spring 6 is disposed between the moving member 4 and the body 20 or the base 3. The gas thread 5 is connected to a thread wheel 7 and connected to the moving member 4 through a center axis 43 on the thread wheel 7. In this embodiment, the spring 6 is disposed between the bottom of the body 20 and the thread wheel 7 so that the gas thread 5 can pull the moving member 4 to rotate through the thread wheel 7 so that the moving member 4 can generate a processional rotation by a loading spring force and a resetting rotation by a releasing spring force.

Referring to FIG. 2, a second air control valve 8 is contained in the upper part of the body 20. The second air control valve 8 has a valve 80, the valve 80 being disposed in the upper cavity 201 between the air inlet 21 and the moving member 4. The valve 80 has a piston 81 which can be pulled by the back pressure of the engine 1, and a valve mouth 82 connecting the air inlet 31 and the upper cavity 201. A pressure room 83 is formed between the top of the piston 81 and the inner walls of the body 20. The pressure room 83 has a pressure tube 84 connected with a pressure end 13 of the engine 1. A spring 85 is disposed between the top of the piston 81 and the inner walls of the body 20. The spring 85 is configured for driving the piston 81 to close the valve mouth 82.

Referring to FIG. 7, when the automobile engine 1 is started, the pressure generated by the pressure end 13 of the engine 1 attracts the piston 81 through the pressure tube 84 and the pressure room 83 so as to push the piston 81 to overcome the spring force from the spring 85 and move upward. This way the piston 81 opens the valve mouth 82 of the valve 80, makes the air flowing path 23 through, and make the second air to be supplied from the air inlet port 10 to the exhaust port 12 by the exhaust gas pressure. During this process, a driver can control the accelerator to be gradually open or closed. By controlling the gate 41 and the cover part 42 of the moving member 4 by the gas thread 5, the driver can control the opening areas of the openings 31, 311 and 312 so as to control the second air flow in the air flowing path 23.

Figure 25:
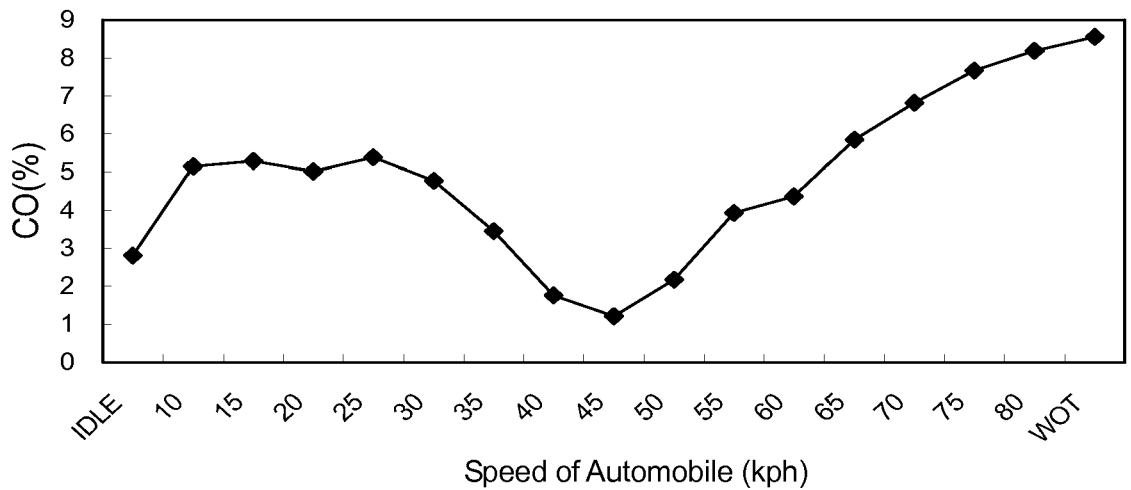
FIG. 25 illustrates a relationship between the CO composition in exhaust gas and an automobile speed.
Figure 26:
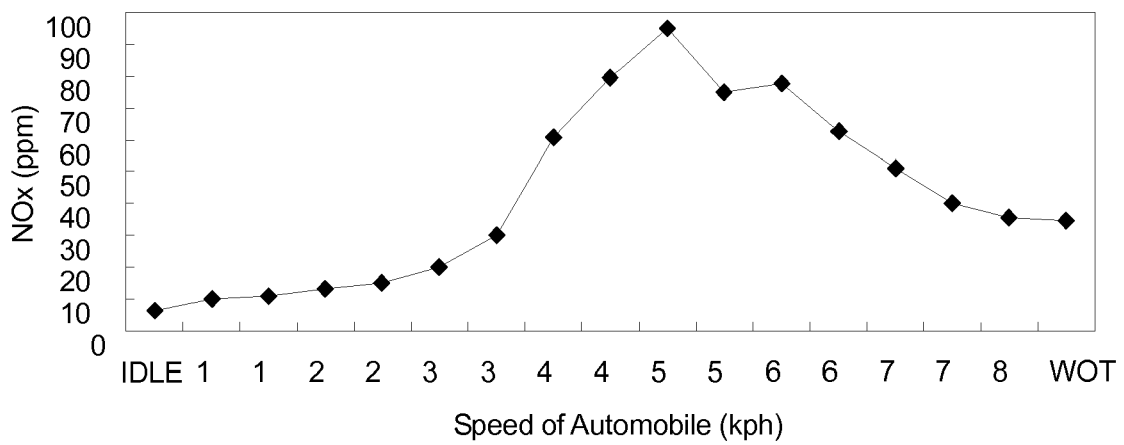
FIG. 26 illustrates a relationship between the $NO_x$ composition in exhaust gas and an automobile speed.

Referring to FIG. 25 and FIG. 26, when the automobile accelerates but before it reaches 35 km/hr, the amount of CO in the exhaust gas gradually decreases but the $NO_x$ amount gradually increases. So the opening areas of the opening 31, 311 and 312 are decreased controlled by the gas thread 5 (referring to FIG. 5, FIG. 8, FIG. 9, and FIG. 10), so that the supply of the second air to the exhaust port 12 is decreased. This will be helpful to the oxidation reaction between the catalyst in the catalytic converter 91a and CO at first and then helpful to the reduction reaction between the catalyst in the catalytic converter 91a and the $NO_x$.

Figure 14:
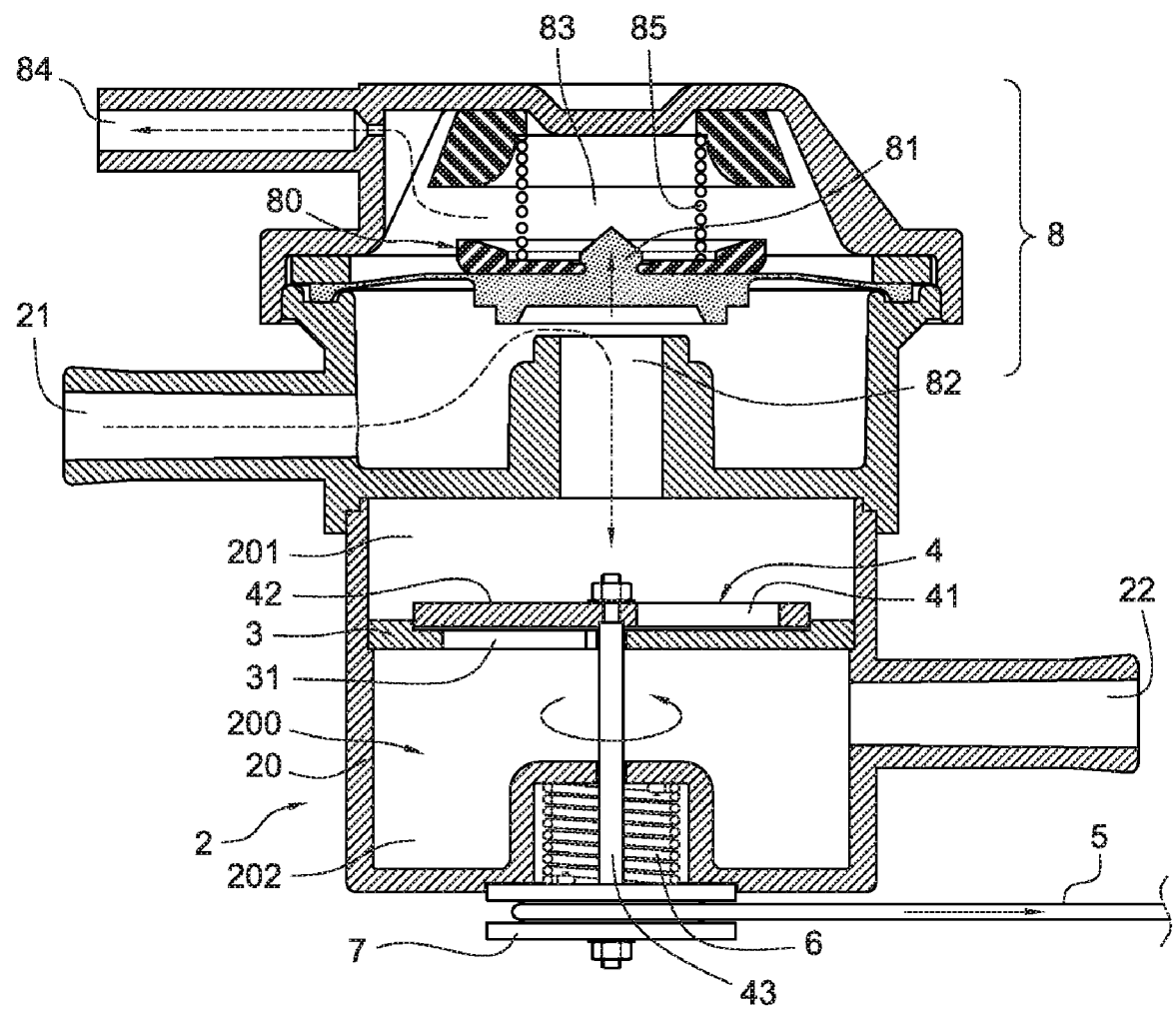
FIG. 14 is a cross-sectional view of the second air flow control apparatus of FIG. 2 in another working status.

When the automobile is at a speed between 35 km/hr and 55 km/hr, the amount of CO in the exhaust gas is relatively low but the amount of $NO_x$ increases by a great amount (referring to FIG. 25 and FIG. 26). So, referring to FIG. 11 and FIG. 14, the opening areas of the openings 31, 311 and 312 will be closed controlled by the gas thread 5 so that the second air supply to the exhaust port 12 is cut off, which is helpful for the reduction reaction between $NO_x$ and the catalyst in the catalytic converter 91.

When the automobile is at a speed over 55 km/hr, the amount of CO in the exhaust gas increases gradually, but the amount of $NO_x$ in the exhaust gas decreases gradually (referring to FIG. 25 and FIG. 26). So, referring to FIG. 12 and FIG. 13, the opening areas of the openings 31 will be increased controlled by the gas thread 5 so that the second air supply to the exhaust port 12 increases, which is helpful for the reduction reaction between $NO_x$ and the catalyst in the catalytic converter 91 at first and then helpful for the oxidation reaction between CO and the catalyst in the catalytic converter 91.

Hence by controlling the accelerator of the automobile the amount of the second air supplied to the exhaust port 12 through the air flowing path 23 by the air inlet port 10 can be precisely controlled, so that the harmful CO and $NO_x$ in the exhaust gas of the engine 1 can be effectively eliminated, and the efficiency of clarifying the exhaust gas of the engine 1 is improved.

Figure 15:
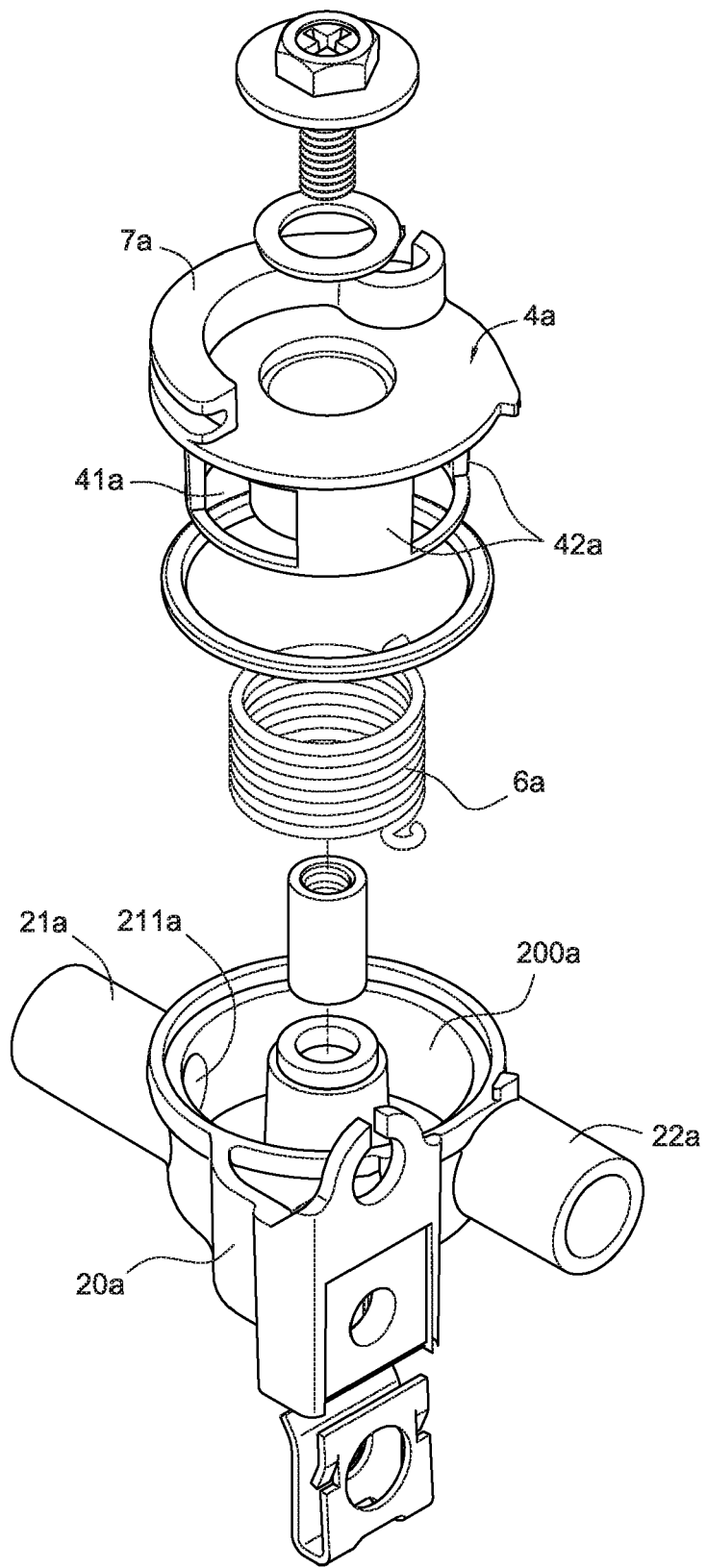
FIG. 15 is a perspective blow-up view of a second air flow control apparatus in accordance with a second embodiment of the present invention.
Figure 16:
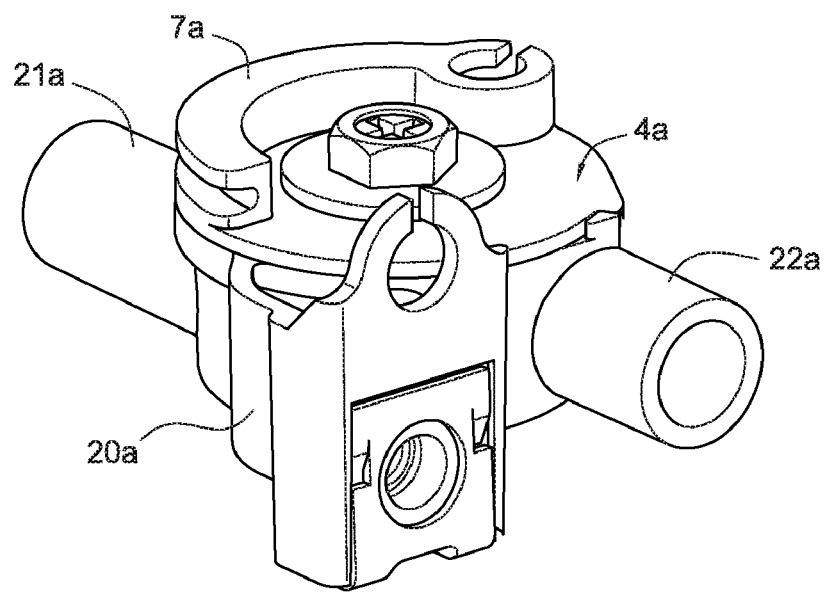
FIG. 16 is a perspective view of the second air flow control apparatus of FIG. 15.

Referring to FIG. 15, a second air flow control apparatus in accordance with a second embodiment of the present invention is provided. The second air flow control apparatus 12a, disposed between an air inlet port 10a of an engine 1 and an exhaust port 12a (as shown in FIG. 1). The air inlet port 10a is an air filter connected with an air inlet passage 11a of the engine 1a. The exhaust port 12a includes an air outlet passage of the engine 1a, a muter 9a and at least a catalytic converter 91a, the air outlet passage of the engine 1, the muter 9 and the at least a catalytic converter 91 being connected in series. The exhausting pressure of the exhaust gas in the air outlet passage of the engine 1a pushes a second air from the air inlet port 10a to the exhaust port 12a. The second air flow control apparatus 2a includes a body 20a, a moving member 4a, and a gas thread 5a.

Referring to FIG. 1, the body 20a has a cavity 200a, an air inlet 21a and an air outlet 22a. The air inlet 21a and the air outlet 22a are connected through the cavity 200a. The air inlet 21a is connected with the air inlet port 10a. The air outlet 22a is connected with the exhaust port 12a. An air flowing path 23a is formed by the air inlet port 10a, the air inlet 21a, the air outlet 22a and the exhaust port 12a.

The moving member 4a is pivotably disposed on the body 20a by a loading spring force. The moving member 4a has at least a gate 41a extending and implanted into the cavity 200a, and at least a cover 42a near to an end of the gate 41a.

Figure 17:
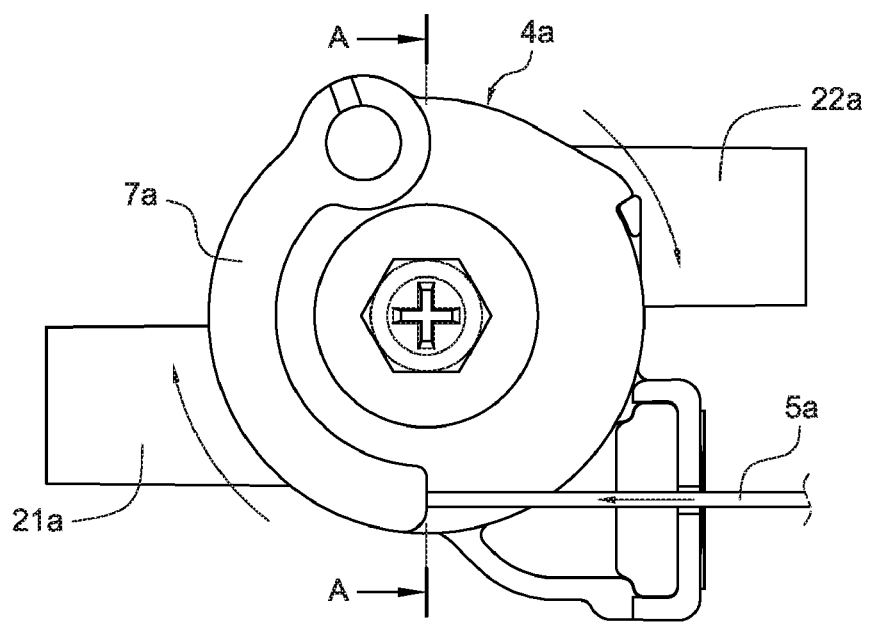
FIG. 17 is a top down view of the second air flow control apparatus of FIG. 15.
Figure 18:
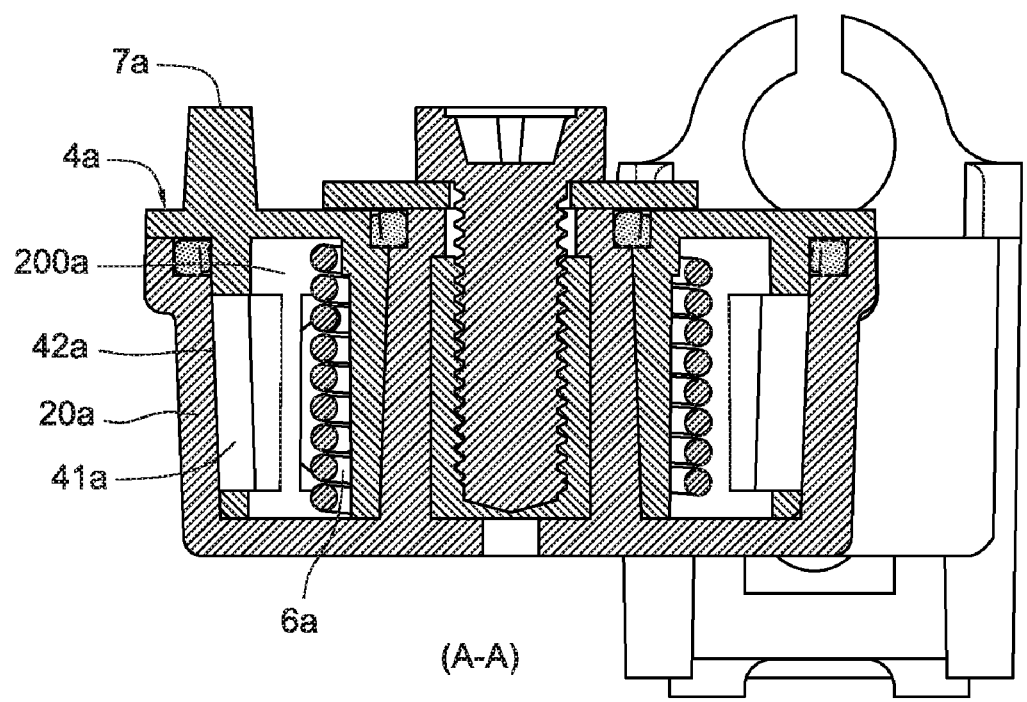
FIG. 18 is a cross-sectional view of the second air flow control apparatus of FIG. 17 in line A-A.
Figure 19:
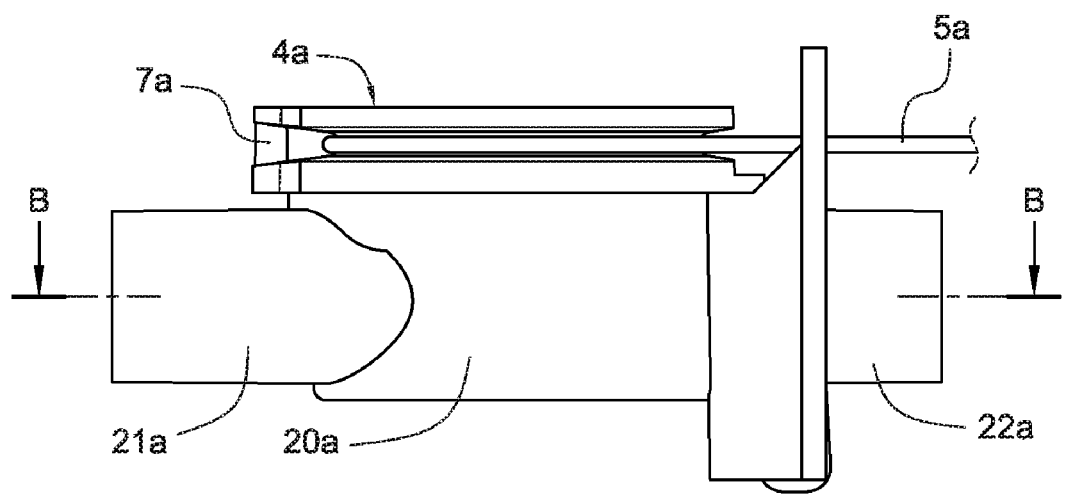
FIG. 19 is a side view of the second air flow control apparatus of FIG. 15.
Figure 20:
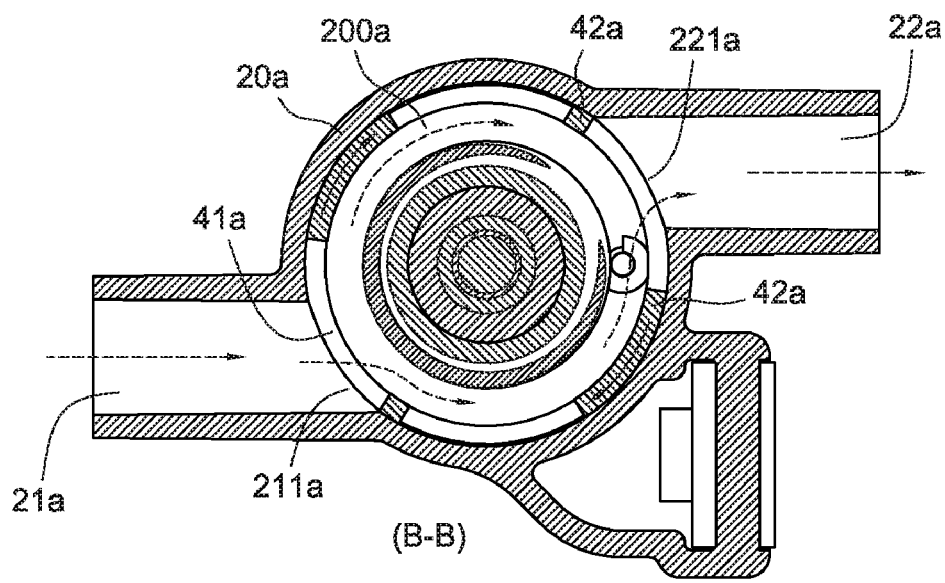
FIG. 20 is a cross-sectional view of the second air flow control apparatus of FIG. 19 in line B-B.
Figure 21:
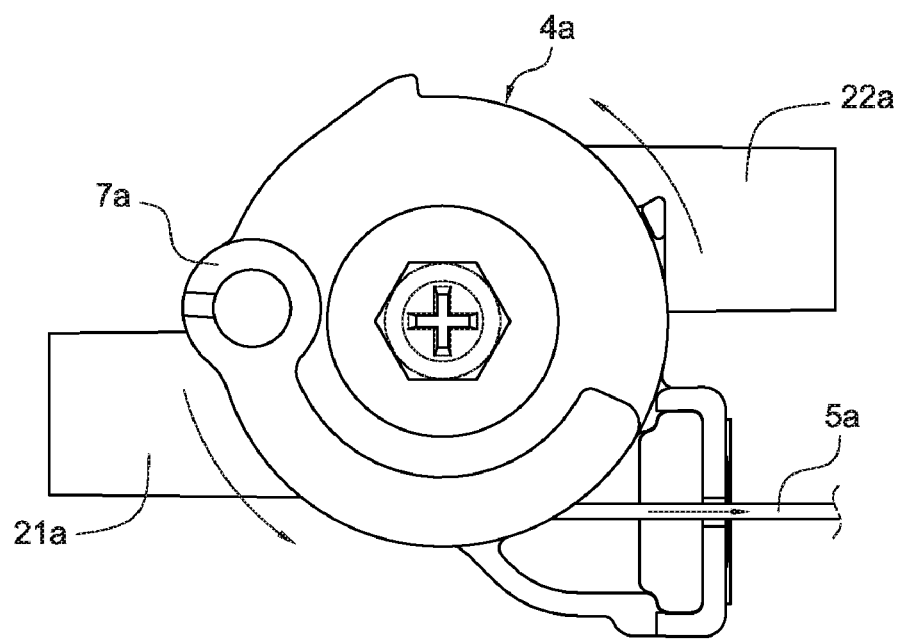
FIG. 21 is a cross-sectional view of the second air flow control apparatus of FIG. 17 in a working status.

The gas thread 5a is connected to the moving member 4a. The gas thread 5a can pull the moving member 4a to generate a processional rotation by a loading spring force (referring to FIG. 21 to FIG. 24), and a resetting rotation by a releasing spring force (referring to FIG. 17 and FIG. 20), which control the gate 41a and the cover part 42a to adjust the opening area of at least one of a tube mouth 211a and a tube mouth 221a of the air inlet 21a and the air outlet 22a in the cavity 200a, and control the cover part 42a to cover the tube mouth 211a and the tube mouth 221a so as to control the second air flow in the air flowing path 23a.

In further embodiments, the gas thread 5a pulling the moving member 4a to have a processional rotation is defined as the process of the engine 1a accelerates from a low speed to a high speed. The gas thread 5a releasing the moving member 4a to have a resetting rotation is defines as the process of the engine 1a decelerates from a high speed to a low speed. In moving or resetting process, the gate 41a and the cover part 42a can control the tube mouth 211a and 221a to gradually change from being open to being closed (referring to FIG. 22 and FIG. 23), or to gradually change from being closed to being open (as shown in FIG. 24). When the tube mouth 211a and 221a are closed, which is defined as the engine 1 having a speed between 35 km/hr to 55 km/hr in a city or traffic driving mode, the second air is blocked from flowing into the exhaust port 12a. A spring 6a is disposed between the moving member 4a and the body 20a, which provides a loading spring force for generating a processional rotation of the moving member 4a and a releasing spring force for generating a resetting rotation of the moving member 4a (referring to FIG. 17 and FIG. 21). The gas thread 5a is connected to a thread wheel 7a, which is formed on the top of the moving member 4a for pulling the moving member 4a to have a processional rotation.

Referring to FIG. 1, when the automobile engine 1a is started, the second air can be supplied from the air inlet port 10 to the exhaust port 12a by the exhaust gas pressure. During this process, a driver can control the accelerator to be gradually open or closed. By controlling the gate 41a and the cover part 42a of the moving member 4a by the gas thread 5, the driver can control the opening areas of the tube mouth 211a and 221a so as to control the second air flow in the air flowing path 23a (referring to FIG. 20, FIG. 22, FIG. 23, FIG. 24).

Figure 22:
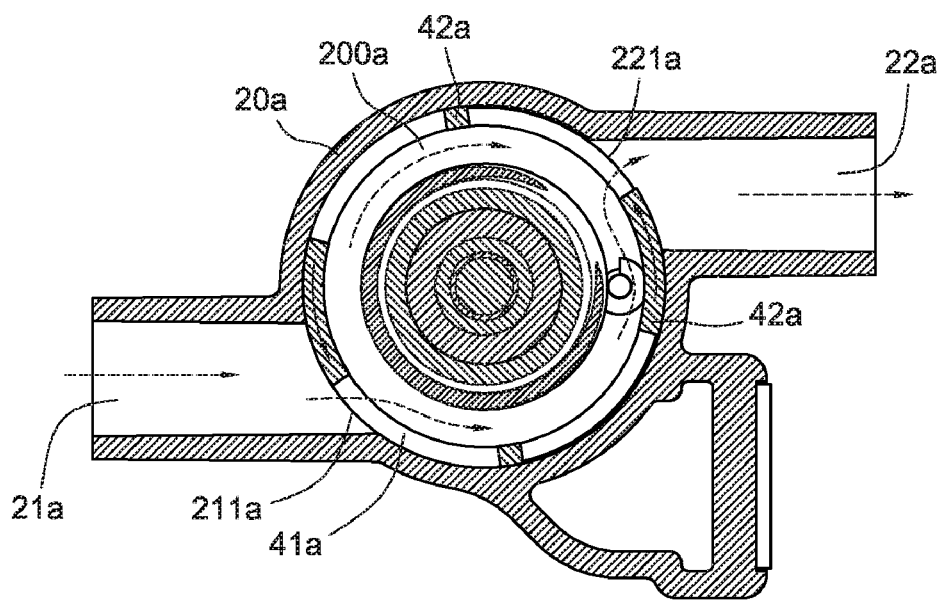
FIG. 22 is a cross-sectional view of the second air flow control apparatus of FIG. 20 in a working status.

Referring to FIG. 22, when the automobile accelerates but before it reaches 35 km/hr, the opening areas of the tube mouth 211a and 221a are decreased controlled by the gas thread 5a, so that the supply of the second air to the exhaust port 12a is decreased. This will be helpful to the oxidation reaction between the catalyst in the catalytic converter 91a and CO at first and then helpful to the reduction reaction between the catalyst in the catalytic converter 91a and the $NO_x$.

Figure 23:
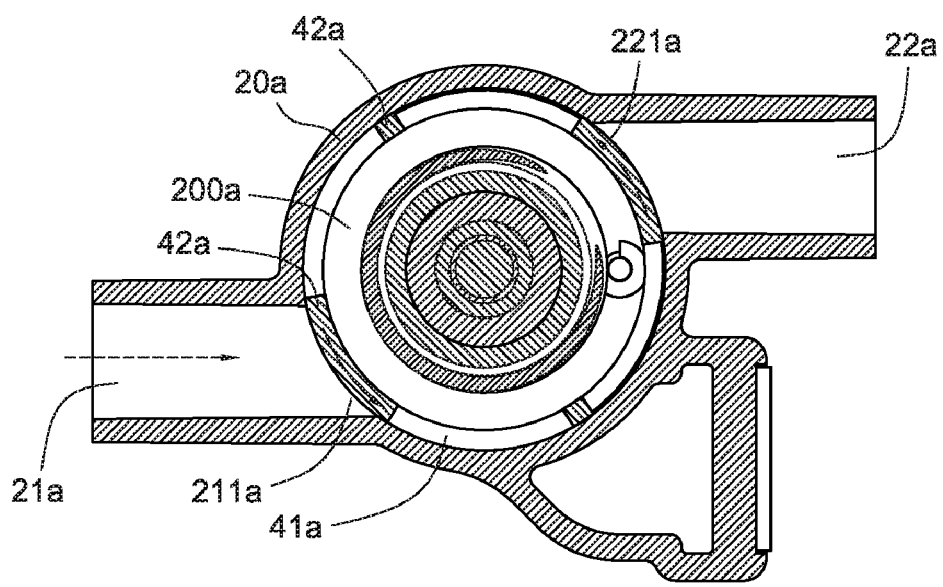
FIG. 23 is a cross-sectional view of the second air flow control apparatus of FIG. 20 in another working status.
Figure 24:
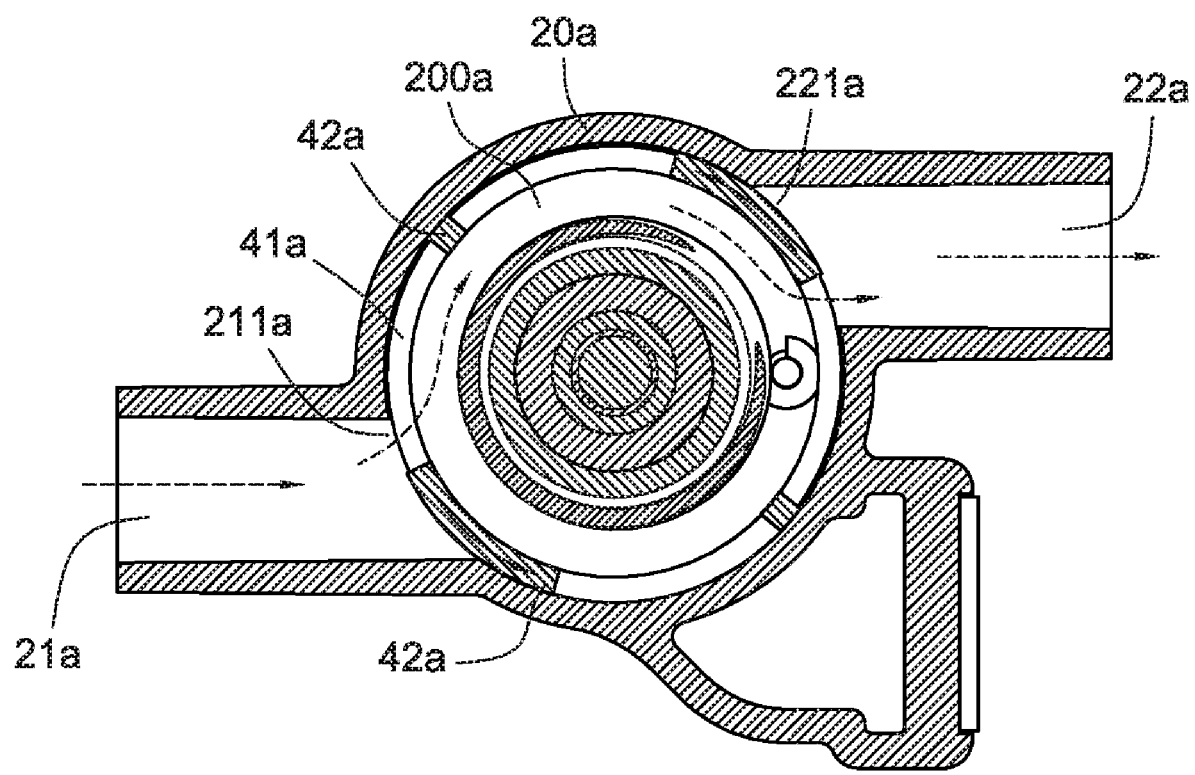
FIG. 24 is a cross-sectional view of the second air flow control apparatus of FIG. 20 in still another working status.

When the automobile is at a speed between 35 km/hr and 55 km/hr, referring to FIG. 23, the tube mouths 211a and 221a will be closed controlled by the gas thread 5a so that the second air supply to the exhaust port 12a is cut off, which is helpful for the reduction reaction between $NO_x$ and the catalyst in the catalytic converter 91a.

When the automobile is at a speed over 55 km/hr, referring to FIG. 24, the opening areas of the tube mouths 211a and 221a will be increased controlled by the gas thread 5a so that the second air supply to the exhaust port 12 increases, which is helpful for the reduction reaction between $NO_x$ and the catalyst in the catalytic converter 91a at first and then helpful for the oxidation reaction between CO and the catalyst in the catalytic converter 91a.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A second air flow control apparatus, being disposed between an air inlet port of an engine and an exhaust port and configured for pushing a second air from the air inlet port to the exhaust port by the exhausting pressure of the exhaust gas, the second air flow control apparatus comprising:

a body, having a cavity, an air inlet and an air outlet, the air inlet and the air outlet being connected through the cavity, the air inlet being connected with the air inlet port, the air outlet being connected with the exhaust port, an air flowing path being formed by the air inlet port, the air inlet, the air outlet and the exhaust port;

a base, fixed in the cavity, having at least an opening for controlling the air flow through the air flowing path;

a moving member pivotably disposed in the cavity or the base by a spring force and having at least a gate and a cover configured for controlling the area of the opening; and a gas thread being connected to the moving member and configured for pulling the moving member to generate a processional rotation by a loading spring force and a resetting rotation by a releasing spring force, the rotations being configured for controlling the gate and the cover part to adjust the opening area of the opening and for controlling the cover part to close the opening so as to control the second air flow in the air flowing path, wherein a spring is disposed between the moving member and the body or the base, the spring being configured for making the moving member generate a processional rotation by a loading spring force and a resetting rotation by a releasing spring force.

2. The second air flow control apparatus of claim 1, wherein the gas thread pulling the moving member to have a processional rotation is defined as the process of the engine accelerates from a low speed to a high speed, the gas thread releasing the moving member to have a resetting rotation is defines as the process of the engine decelerates from a high speed to a low speed, and in processing or resetting process, the gate and the cover part can control the opening to gradually change from being open to being closed or to gradually change from being closed to being open.

3. The second air flow control apparatus of claim 1, wherein when the opening is closed, which is defined as the engine having a speed between 35 km/hr to 55 km/hr in a city or traffic driving mode, the second air is blocked from flowing into the exhaust port.

4. The second air flow control apparatus of claim 1, wherein there are multiple openings, the multiple openings being disposed next to each other on the base along the direction the moving member moves or resets.

5. The second air flow control apparatus of claim 1, wherein the opening is composed by multiple net holes.

6. The second air flow control apparatus of claim 1, wherein the gas thread is connected to a thread wheel and connected to the moving member through a center axis on the thread wheel for pulling the moving member have a processional rotation.

7. The second air flow control apparatus of claim 1, wherein a second air control valve is contained in the upper part of the body, the second air control valve having a valve, the valve being disposed in the cavity between the air inlet and the moving member.

8. A second air flow control apparatus, being disposed between an air inlet port of an engine and an exhaust port and configured for pushing a second air from the air inlet port to the exhaust port by the exhausting pressure of the exhaust gas, the second air flow control apparatus comprising:

a body, having a cavity, an air inlet and an air outlet, the air inlet and the air outlet being connected through the cavity, the air inlet being connected with the air inlet port, the air outlet being connected with the exhaust port, an air flowing path being formed by the air inlet port, the air inlet, the air outlet and the exhaust port;

a moving member pivotably disposed on the body by a loading spring force, the moving member having at least a gate extending and implanted into the cavity, and at least a cover near to an end of the gate; and a gas thread connected to the moving member, the gas thread being configured for pulling the moving member to generate a processional rotation by a loading spring force and a resetting rotation by a releasing spring force, the rotations being configured for controlling the gate and the cover part to adjust the opening area of at least a tube mouth of the air inlet and the air outlet in the cavity, and for controlling the cover part to cover the tube mouth so as to control the second air flow in the air flowing path, wherein a spring is disposed between the moving member and the body, the spring being configured for generating a processional rotation of the moving member by a loading spring force and a resetting rotation of the moving member by a releasing spring force.

9. The second air flow control apparatus of claim 8, wherein the gas thread pulling the moving member to have a processional rotation is defined as the process of the engine accelerates from a low speed to a high speed, the gas thread releasing the moving member to have a resetting rotation is defines as the process of the engine decelerates from a high speed to a low speed, and in the processing or resetting process, the gate and the cover part can control the tube mouth to gradually change from being open to being closed or to gradually change from being closed to being open.

10. The second air flow control apparatus of claim 8, wherein when the tube mouth is closed, which is defined as the engine having a speed between 35 km/hr to 55 km/hr in a city or traffic driving mode, the second air is blocked from flowing into the exhaust port.

11. The second air flow control apparatus of claim 8, wherein the gas thread is connected to a thread wheel, the thread wheel being formed on a side of the moving member for pulling the moving member to have a processional rotation.

* * * * *